Patented May 17, 1927.

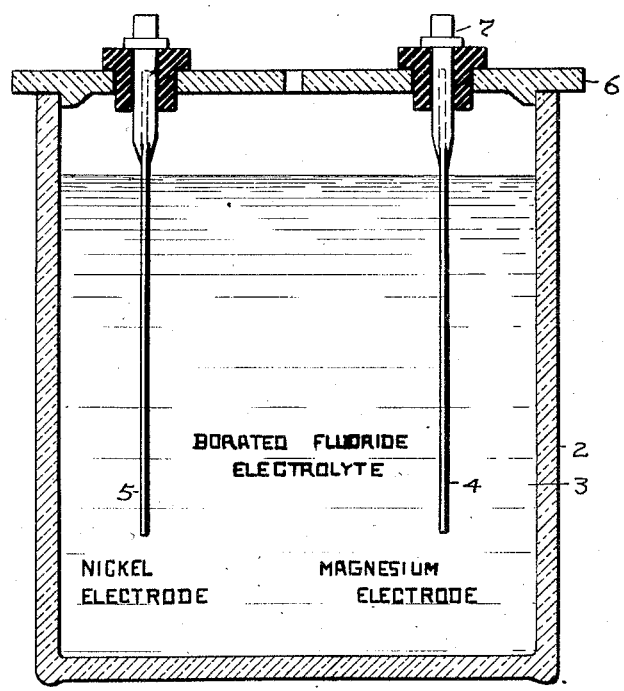

1,628,785

UNITED STATES PATENT OFFICE.

LEWIS JAMES KEELER, OF CLEVELAND, OHIO, ASSIGNOR, BY DIRECT AND MESNE ASSIGNMENTS, OF ONE-HALF TO LE RUE P. BENSING, OF CLEVELAND, OHIO, AND ONE-HALF TO GEORGE P. KOELLIKER, OF CLEVELAND HEIGHTS, OHIO.

ELECTROLYTIC RECTIFIER.

Application filed January 18, 1926. Serial No. 81,987.

This invention relates to electrolytic rectifiers, that is, to devices for converting an alternating current into a direct current, and the invention is an improvement in the electrolytic rectifiers disclosed in the co-pending applications of Le Rue P. Bensing Serial Nos. 28,524, and 53,750, and which rectifiers comprise certain metals and electrolytes adapted to prevent the positive phase of the alternating current from flowing but allows the negative phase to flow freely. My present object is to use the same metals set forth in said applications or any other metal having the inherent property to function as an electrolytic valve, and as a non-film electrode, with a modified electrolyte, whereby I obtain a very permanent rectifier which can be used for charging storage batteries, as a condenser, and especially as an A and B battery eliminator, for radio apparatus.

In the accompanying drawing, the single figure is a sectional view of a rectifier constructed according to my invention.

As shown, the rectifier comprises a suitable jar or container 2 for aqueous electrolyte 3, in which two metal electrodes 4 and 5 are suspended, preferably from a cap or cover 6, it being understood that this showing merely exemplifies a common arrangement of parts in which the invention may be present. Thus, the container or jar 2 may be of glass or other material, and cap 6 may be made of hard rubber having openings through which the electrodes may extend into the jar about two inches apart and down to within a few inches of the bottom of the jar. One electrode 4, may be made of or contain magnesium, and the other electrode 5 may consist of nickel, a nickel alloy, or any other suitable metal. The magnesium electrode may be protected from the atmosphere and from the galvanic action of the electrical connection by using a terminal 7 of any desired protecting material which may be affixed to the electrode in any suitable manner.

I am aware that an electrolytic valve action is a characteristic of magnesium, and in my experiments I find that magnesium or a magnesium base alloy will show valve action in a great number of solutions. But in nearly all of them there is no permanency.

In the electrolyte which I employ together with a magnesium electrode and a nickel electrode, I may use one percent or more of any one of a great number of alkalescent compounds mixed with a certain type of compound, such as potassium fluoride, which is readily soluble in water. Such an alkalescent compound will rectify perfectly with magnesium or its alloys used as an electrode. In some compounds used as the aqueous electrolyte, there will be an attack on an electrode of magnesium, due to the fact that at certain voltages there will be a breaking down of the film, thus allowing some of the positive phase to flow, which disintegrates the magnesium. In other solutions an electrode of nickel or other metal will be attacked, and still others give harmful fumes or odors.

In my electrolyte, I use alkalescent compounds, from one percent to any concentration obtainable, for example, compounds of organic acids, such as Rochelle salt; phosphates like tri-sodium phosphate; oleates; borates; cyanides such as sodium cyanides; and the alkali metal hydroxides, which are soluble. As before mentioned any of the above classifications will serve as an electrolyte when used with a fluoride and magnesium or its alloys, but I have discovered that a borated fluoride gives the best results.

In that connection hydrofluoric acid of any percentage has no dissolving effect on magnesium if the magnesium is allowed to remain in a solution of hydrofluoric acid, whether the solution is cold or boiling. Now, if magnesium or magnesium base alloy be made the rectifying element in such a solution, and alternating current be impressed, the positive phase will not flow but the negative phase will flow freely, thereby providing a continuous direct flow of current. The disadvantage here is that hydrofluoric acid is a very harmful acid, giving off a gas when the current is passed, which attacks the mucous membrane. Nor is it possible to find a suitable non-film electrode to carry the current. All non-film electrodes are rapidly attacked. But there is no errosion of magnesium or its alloys.

Again if an alkali metal hydroxide is taken it will be found that magnesium or its alloys is not affected by any concentration of an alkali hydroxide solution, whether it may be cold or boiling. If the alkali metal hydroxide, say potassium hydroxide be made the electrolyte, it will be noticed that magnesium will rectify the alternating current to direct current. The condition must be quite exact though. The film formed on the magnesium will not withstand a suitable voltage thus allowing a positive current to flow which has a tenfold bad effect, that of poorly filtered current and a wearing away of the magnesium rectifying element. Also the solution gives off bothersome fumes.

If a simple fluoride salt is used such as potassium fluoride rectification is without fault, and a number of metals are unaltered by such an aqueous solution if neutralized or made slightly alkaline. When an aqueous solution of potassium fluoride is used as the electrolyte and magnesium or magnesium base alloy used as the electrolytic valve and another metal as the opposite electrode, it will be found that under certain conditions fluorine may be evolved when the current flows, and an electrode of nickel or other metal may be attacked.

By adding alkalescent compounds to a water soluble fluoride an exceptionally permanent electrolytic rectifier may be obtained. Such a fluoride may be potassium fluoride which is very soluble in water, and the alkalescent compound which I have found to give the best results is borax. Then the electrolyte remains constant like sulphuric acid electrolyte and the cathode and anode have great permanency. The electrolyte has suitable conductance and there are no odors given off when the cell is in operation.

The concentration of the electrolyte may vary within wide limits, say from one percent of an alkalescent compound to its saturation point, and one percent of a water soluble fluoride to its saturation point, dependent upon the commercial application. The solubility may be increased in cases where the solubility is low, say borax which may be increased greatly by adding a large amount of glycerine, or by the very presence of a fluoride the solubility of borax is increased. Borax is soluble to three to four parts per hundred in water at about twenty-five degrees centigrade, whereas in a fluoride the solubility of borax is increased ten percent or more according to the concentration of the fluoride.

As an example, I will now describe a suitable combination in detail as I prepare it and use it in my rectifier.

I take 300 grams of chemically pure potassium fluoride and dissolve it in 500 cubic centimeters of distilled water. If the solution is not acid, it is made so, with hydrofluoric acid and boiled for five minutes. This operation can be performed in a pyrex beaker; then 100 grams of borax are added and the solution heated until all of the salt is in solution. The solution is filtered, and when cooled made up to 1000 c. c.; this will give a solution or electrolyte containing 30 percent of potassium fluoride and 10 percent of borax. This solution or electrolyte provides an ideal permanent rectifier; the conductivity is very good; and the rectifier may be operated successfully without attention except for the addition of water at intervals. I do not wish to confine myself to the exact percentages in the solution given as I may use any percentage of salts from a very small percent to as much as can be dissolved in an aqueous solution, since magnesium is not attacked at any concentration by the above aqueous solution.

What I claim, is:

1. A permanent electrolytic rectifier, comprising an anode, a cathode, and a borated fluoride electrolyte in which the fluoride is in a preponderating amount relatively to the borate.

2. A permanent electrolytic rectifier, including an electrode containing magnesium, and a fluoride electrolyte containing a substance having borate properties, the fluoride being in excess of the borate.

3. A permanent electrolytic rectifier, comprising a rectifying element, an electrode containing nickel, and a borated fluoride electrolyte in which the fluoride is in excess of the borate.

4. A permanent electrolytic rectifier, comprising an electrode containing magnesium, an electrode containing nickel, and a borated fluoride electrolyte, the fluoride in the electrolyte being in preponderance to the borate.

5. A permanent electrolytic rectifier, comprising an anode, a cathode, and an aqueous electrolyte containing a borated fluoride, the fluoride being in excess of one percent and in excess of the borate.

6. A permanent electrolytic rectifier, comprising an anode, a cathode, and an aqueous electrolyte containing approximately thirty percent of potassium fluoride and ten percent of borax.

7. A permanent electrolytic rectifier, comprising an anode, a cathode, and a potassium fluoride electrolyte containing borax, the fluoride being approximately two to three times in excess of the borate used.

8. An electrolyte for electrolytic rectifiers, comprising a fluoride and a borate, the fluoride being in excess of the borate.

9. An electrolyte for electrolytic rectifiers, comprising a fluoride, a lesser percentage of a borate, together with glycerine to enhance the solubility of the borate.

10. An electrolyte for electrolytic rectifiers, comprising a fluoride and borax, the amount of fluoride in solution being at least double the amount of borax.

In testimony whereof I affix my signature.

LEWIS JAMES KEELER.